(12) United States Patent
Niwa

(10) Patent No.: US 10,428,932 B2
(45) Date of Patent: Oct. 1, 2019

(54) SHIFT DEVICE

(71) Applicant: KABUSHIKI KAISHA TOKAI-RIKA-DENKI-SEISAKUSHO, Aichi (JP)

(72) Inventor: Takehiro Niwa, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/324,817

(22) PCT Filed: Jun. 8, 2015

(86) PCT No.: PCT/JP2015/066491
§ 371 (c)(1),
(2) Date: Jan. 9, 2017

(87) PCT Pub. No.: WO2016/017282
PCT Pub. Date: Feb. 4, 2016

(65) Prior Publication Data
US 2017/0204965 A1 Jul. 20, 2017

(30) Foreign Application Priority Data
Jul. 29, 2014 (JP) ................................ 2014-153685

(51) Int. Cl.
*F16H 59/02* (2006.01)
*B60K 20/02* (2006.01)
(Continued)

(52) U.S. Cl.
CPC ......... *F16H 59/0278* (2013.01); *B60K 20/02* (2013.01); *B60K 20/04* (2013.01); *F16H 59/10* (2013.01); *F16H 2059/026* (2013.01)

(58) Field of Classification Search
CPC ................ F16H 59/0278; F16H 59/10; F16H 2059/026; B60K 20/02
See application file for complete search history.

(56) References Cited

U.S. PATENT DOCUMENTS

2006/0060019 A1* 3/2006 Sato ........................ F16H 59/10
74/473.23
2007/0144295 A1* 6/2007 Otashiro ............... B60R 25/066
74/473.21
(Continued)

FOREIGN PATENT DOCUMENTS

| JP | 2009-006910 | 1/2009 |
| JP | 2012-240488 | 12/2012 |

OTHER PUBLICATIONS

International Search Report issued in a corresponding application PCT/JP2015/066491 dated Sep. 1, 2015.

*Primary Examiner* — Zakaria Elahmadi
(74) *Attorney, Agent, or Firm* — Roberts Mlotkowski Safran Cole & Calderon P.C.

(57) ABSTRACT

At a shift lever device, a shift lever is supported at a retainer due to the shift lever being inserted into the retainer from an upper side portion, and select shafts of the shift lever being inserted into select frames of the retainer. Here, at the select shafts, amounts of projection of circular shafts and intermediate shafts are small as compared with amounts of projection of plate shafts. At a time when the select shafts are inserted into the select frames, the circular shafts and intermediate shafts can pass supporting pillars of the select frames, and an angle of tilting of the shift lever with respect to the retainer in a left-right direction can be made to be small. Therefore, a left-right direction dimension of the retainer can be made to be small, and the shift lever device can be made to be compact in the left-right direction.

9 Claims, 4 Drawing Sheets

(51) Int. Cl.
*F16H 59/10* (2006.01)
*B60K 20/04* (2006.01)

(56) References Cited

U.S. PATENT DOCUMENTS

| | | | | |
|---|---|---|---|---|
| 2014/0345410 | A1* | 11/2014 | Yamamoto | F16H 59/105 |
| | | | | 74/473.3 |
| 2015/0260276 | A1* | 9/2015 | Okumoto | F16H 59/10 |
| | | | | 74/473.34 |
| 2016/0116057 | A1* | 4/2016 | Nakanishi | F16H 59/02 |
| | | | | 74/473.3 |
| 2016/0123460 | A1* | 5/2016 | Tsukazaki | F16H 59/105 |
| | | | | 74/473.23 |
| 2016/0341305 | A1* | 11/2016 | Kato | F16H 59/0278 |
| 2016/0348784 | A1* | 12/2016 | Kato | F16H 59/0278 |
| 2017/0017256 | A1* | 1/2017 | Nakano | F16H 61/24 |
| 2017/0122428 | A1* | 5/2017 | Lunati | F16H 59/10 |

\* cited by examiner

SHIFT DEVICE

CROSS-REFERENCE TO RELATED APPLICATIONS

The present application is a U.S. National Phase of PCT/JP2015/066491 filed on Jun. 8, 2015 claiming priority to Japanese Patent application No. 2014-153685 filed Jul. 29, 2014. The disclosure of the PCT Application is hereby incorporated by reference into the present Application.

TECHNICAL FIELD

The present invention relates to a shift device at which a shift position is changed by a shift body being rotated.

BACKGROUND ART

In the shift lever device disclosed in Japanese Patent Application Laid-Open (JP-A) No. 2012-240488, due to a shift lever being inserted into a supporting tube from a lower side portion, and a rotating shaft of the shift lever being inserted into supporting holes of the supporting tube, the rotating shaft is supported by the peripheral surfaces of the supporting holes, and the shift lever is rotatably supported by the supporting tube.

Further, the rotating shaft can be inserted into the supporting holes from the open portions of the supporting holes, in a state in which the shift lever is tilted with respect to the supporting tube. Due to the rotating range of the shift lever being restricted by a guide after assembly of the shift lever device, the rotating shaft is prevented from separating from the supporting holes via the open portions of the supporting holes.

Here, in such a shift lever device, by making small the tilting angle of the shift lever with respect to the supporting tube at the time when the shift lever is inserted into the supporting tube and the rotating shaft is inserted into the supporting holes from the open portions of the supporting holes, the dimension of the supporting tube in the shift lever tilting direction (a direction that is orthogonal to the rotation axis direction of the shift lever with respect to the supporting tube and to the inserting direction of the shift lever into the supporting tube) can be made to be small, and the shift lever device can be made to be compact in the shift lever tilting direction.

SUMMARY OF INVENTION

Technical Problem

In view of the above-described circumstances, an object of the present invention is to provide a shift device that can be made to be compact in a shift body tilting direction.

Solution to Problem

A shift device of a first aspect of the present invention comprises: a supporting body at which a supporting portion is provided; a shift body that is inserted into the supporting body from one side portion and is rotatably supported by the supporting body, and at which a shift position is changed due to the shift body being rotated; and supported portion that is provided at the shift body, and that has one side portion disposed at a side opposite from the supporting portion with respect to another side portion of the supported portion, wherein, due to the supported portion being supported by the supporting portion, the shift body is rotatably supported by the supporting body.

A shift device of a second aspect of the present invention comprises: a supporting body at which a supporting portion is provided; a shift body that is inserted into the supporting body from one side portion and is rotatably supported by the supporting body, and at which a shift position is changed due to the shift body being rotated; and a supported portion that is provided at the shift body, and that has another side portion disposed at a rotation radial direction outer side of the shift body with respect to one side portion of the supported portion, wherein, due to the supported portion being supported by the supporting portion, the shift body is rotatably supported by the supporting body.

In a shift device of a third aspect of the present invention, in the shift device of the first aspect or the second aspect of the present invention, the shift body is operated at one side of the supporting body.

In a shift device of a fourth aspect of the present invention, in the shift device of any one of the first aspect through the third aspect of the present invention, the supporting portion is disposed at another side of a rotation central axis of the shift body.

A shift device of the fifth aspect of the present invention comprises, in the shift device of any one of the first aspect through the fourth aspect of the present invention, an avoidance portion that is provided at at least one of the supporting body or the shift body, and that causes avoidance of interference of the shift body with the supporting body at a time when the shift body is inserted into the supporting body from the one side portion.

Advantageous Effects of Invention

In the shift device of the first aspect of the present invention, the supporting portion is provided at the supporting body, and the supported portion is provided at the shift body. The shift body is rotatably supported by the supporting body due to the shift body being inserted into the supporting body from one side portion and the supported portion being supported by the supporting portion. Further, the shift position is changed due to the shift body being rotated.

Here, one side portion of the supported portion is disposed at the side opposite from the supporting portion with respect to the other side portion of the supported portion. Therefore, at the time when the shift body is inserted into the supporting body from the one side portion, even if the angle of tilting of the shift body with respect to the supporting body is small, the one side portion of the supported portion can pass the supporting portion, and the supporting portion can support the other side portion of the supported portion. Due thereto, the dimension of the supporting body in the shift body tilting direction can be made to be small, and the shift device can be made to be compact in the shift body tilting direction.

In the shift device of the second aspect of the present invention, the supporting portion is provided at the supporting body, and the supported portion is provided at the shift body. The shift body is rotatably supported by the supporting body due to the shift body being inserted into the supporting body from one side portion and the supported portion being supported by the supporting portion. Further, the shift position is changed due to the shift body being rotated.

Here, the other side portion of the supported portion is disposed at the rotation radial direction outer side of the shift body with respect to the one side portion of the supported portion. Therefore, at the time when the shift body is inserted into the supporting body from the one side portion and the other side portion of the supported portion reaches the position of the supporting portion, even if the angle of tilting of the shift body with respect to the supporting body is small, the other side portion of the supported portion being interfered with by the supporting portion can be avoided. Due thereto, the dimension of the supporting body in the shift body tilting direction can be made to be small, and the shift device can be made to be compact in the shift body tilting direction.

In the shift device of the third aspect of the present invention, the shift body is operated at one side of the supporting body. Therefore, there is no need to insert the portion, that is further toward the other side than the supporting body that is not the side that is operated, of the shift body into the supporting body. Thus, the mechanism portion can easily be provided at the portion, that is further toward the other side than the supporting body, of the shift body.

In the shift device of the fourth aspect of the present invention, the supporting portion is disposed at the other side of the rotation central axis of the shift body. Therefore, the supporting portion can effectively support the shift body.

In the shift device of the fifth aspect of the present invention, the avoidance portion is provided at at least one of the supporting body or the shift body. At the time when the shift body is inserted into the supporting body from the one side portion, the avoidance portion causes avoidance of interference of the shift body with the supporting body. Therefore, the tilting angle of the shift body with respect to the supporting body at the time when the shift body is inserted into the supporting body from the one side portion can be made to be even smaller.

DESCRIPTION OF EMBODIMENTS

Figure 1:
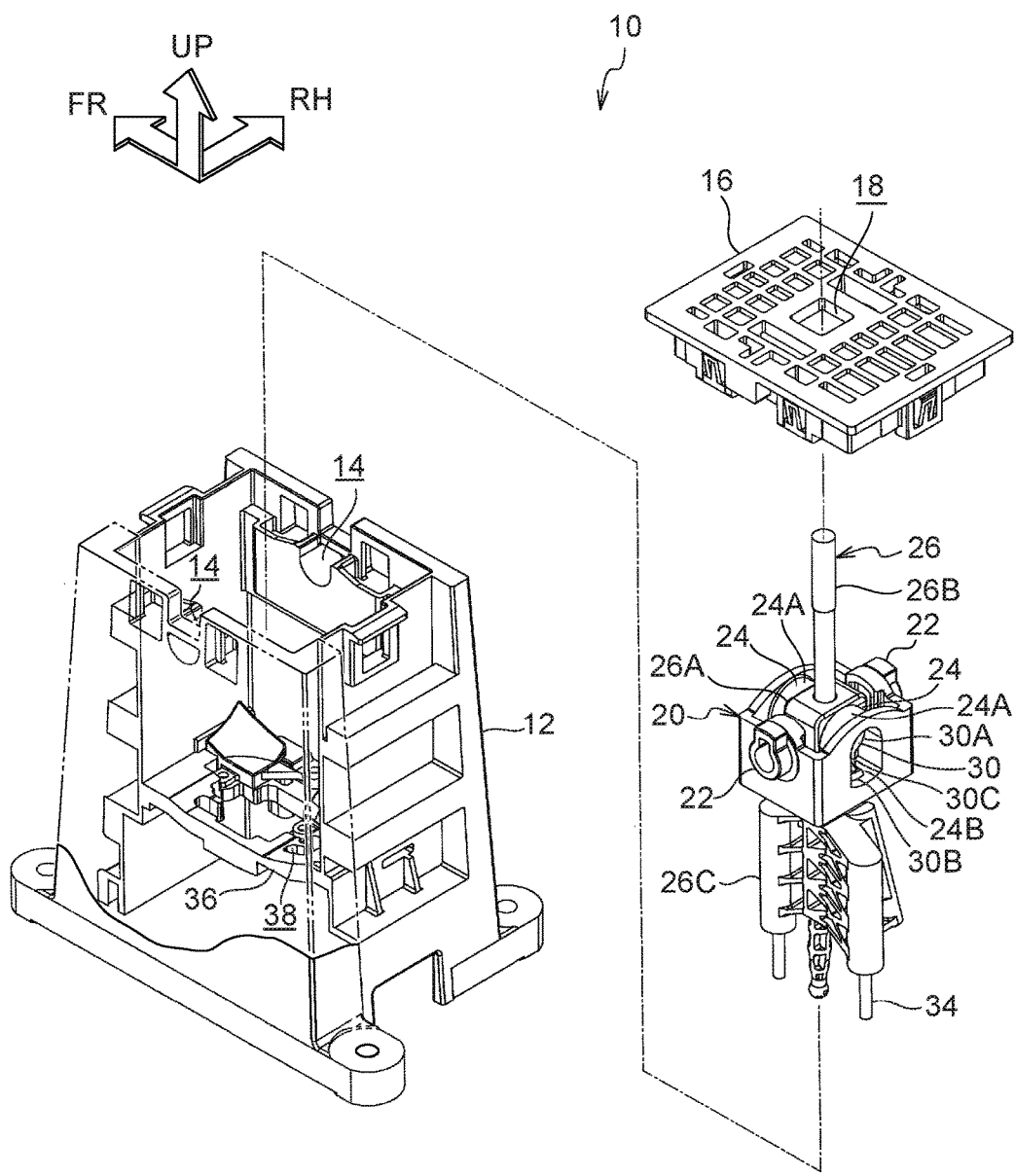
FIG. 1 is an exploded perspective view that is seen from an obliquely left and rear side and shows a shift lever device relating to an embodiment of the present invention.

A shift lever device 10 that serves as a shift device relating to an embodiment of the present invention is shown in FIG. 1 in an exploded perspective view that is seen from an obliquely left and rear side. Note that, in the drawings, the front side of the shift lever device 10 is indicated by arrow FR, the right side of the shift lever device 10 is indicated by arrow RH, and the upper side of the shift lever device 10 is indicated by arrow UP.

The shift lever device 10 relating to the present embodiment is applied to a vehicle (an automobile). The shift lever device 10 is a so-called floor-type device, and is set at the floor portion (the floor) of a vehicle cabin. Further, the front side, the right side and the upper side of the shift lever device 10 face toward the vehicle front side, the vehicle right side and the vehicle upper side, respectively.

As shown in FIG. 1, a base plate 12, that is made of resin and is substantially rectangular tube-shaped and serves as a first supporting body, is provided at the shift lever device 10. The upper surface and the lower surface of the base plate 12 are open. Shift holes 14, that serve as first supporting portions and that are substantially semicircular respectively, are formed in the upper ends of the left wall and the right wall of the base plate 12. The pair of shift holes 14 are respectively open at the upper side and at the interior of the base plate 12, and face in the left-right direction.

A cover 16, that is made of resin and is substantially rectangular plate-shaped, is fixed to the upper end of the base plate 12. The cover 16 covers the upper surface of the base plate 12, and an insert-through hole 18 that is rectangular is formed so as to pass-through the center of the cover 16.

A retainer 20, that is made of resin and is substantially rectangular tube-shaped and serves as a second supporting body (supporting body) and a first shift body, is accommodated within the base plate 12. The upper surface and the lower surface of the retainer 20 are open. Shift shafts 22 that serve as first supported portions are provided integrally with the left surface and the right surface of the base plate 12. The pair of shift shafts 22 project-out toward the left and the right from the base plate 12, respectively. The shift shafts 22 are rotatably supported between the peripheral surfaces of the shift holes 14 of the base plate 12 and the cover 16. The retainer 20 is able to rotate in the front-rear direction with respect to the base plate 12 and with the shift shafts 22 being the central axis.

Figure 2:
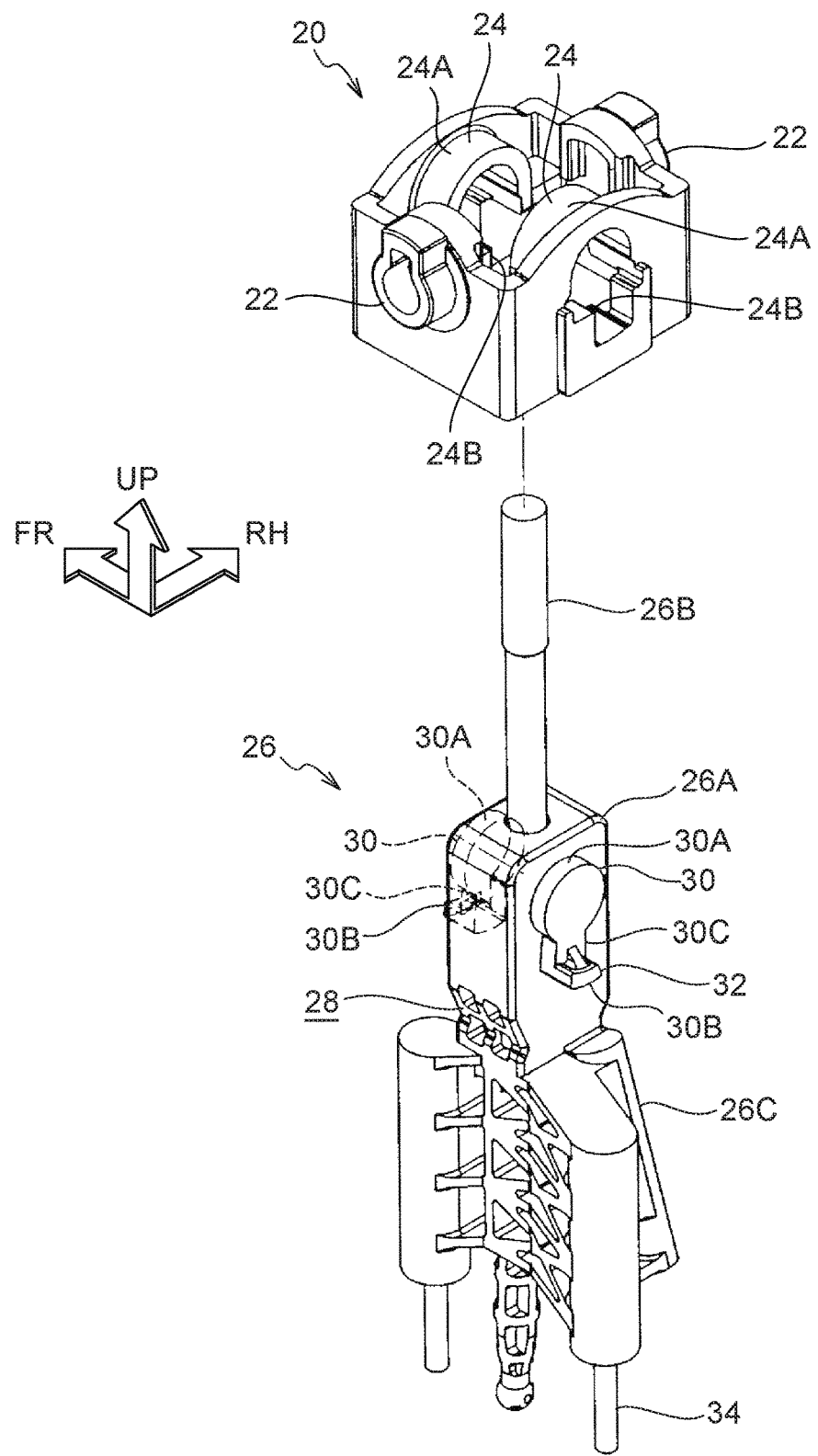
FIG. 2 is an exploded perspective view that is seen from an obliquely left and rear side and shows main portions of the shift lever device relating to the embodiment of the present invention.
Figure 3:
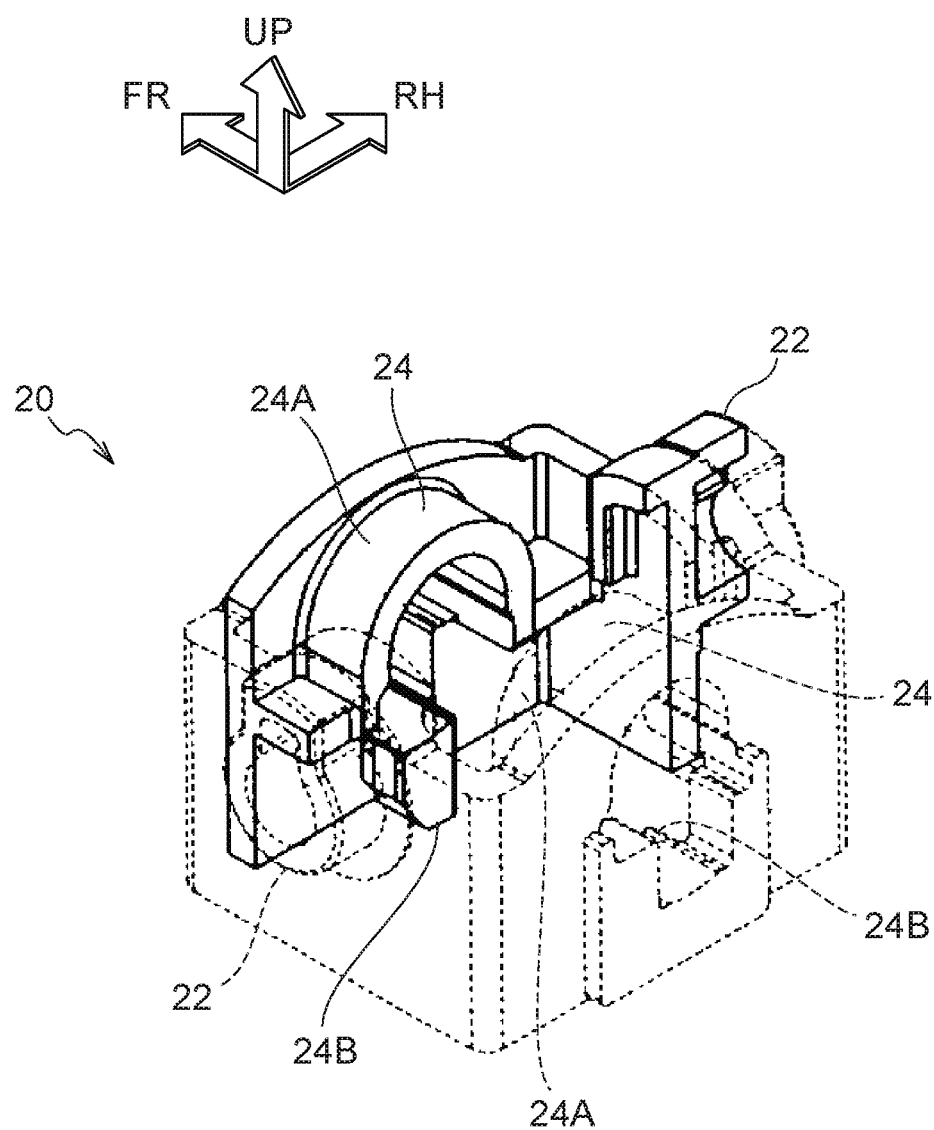
FIG. 3 is a perspective view that is seen from an obliquely left and rear side and shows a retainer of the shift lever device relating to the embodiment of the present invention.

As shown in FIG. 2 and FIG. 3 as well, select frames 24, that respectively serve as second supporting portions (supporting portions) are provided integrally with the front surface and the rear surface of the retainer 20 interior. The pair of select frames 24 respectively project-out into the retainer 20 interior, and face in the front-rear direction. The upper side portions of the select frames 24 are supporting frames 24A that are substantially semi-cylindrical and serve as one side supporting portions, and the interiors of the supporting frames 24A are open toward the lower side. The lower side portions of the select frames 24 are supporting pillars 24B that are substantially rectangular pillar-shaped and serve as other side supporting portions. The supporting pillars 24B extend in the vertical direction, and the upper surfaces thereof are curved in arc shapes in cross-section. The curvature central axes of the inner peripheral surfaces of the supporting frames 24A and the upper surfaces of the supporting pillars 24B coincide with one another. The upper surfaces of the supporting pillars 24B are disposed beneath the curvature central axes, and the radii of curvature thereof are large as compared with those of the inner peripheral surfaces of the supporting frames 24A. The amounts of projection of the supporting pillars 24B into the retainer 20 interior are small as compared with the amounts of projection of the supporting frames 24A into the retainer 20 interior. The front-rear direction distance between the projecting distal end surfaces of the pair of supporting pillars 24B is large as compared with the front-rear direction distance between the projecting distal end surfaces of the pair of supporting frames 24A.

A shift lever 26, that is made of resin and is substantially rod-shaped and serves as a second shift body (shift body), is inserted-through the retainer 20 interior. An intermediate block 26A, that is substantially parallelepiped and serves as an anchor portion, is provided at the vertical direction intermediate portion of the shift lever 26. The intermediate block 26A is disposed between the pair of supporting frames 24A and the pair of supporting pillars 24B at the retainer 20. Movement of the shift lever 26 in the front-rear direction with respect to the retainer 20 is locked at the intermediate block 26A by the pair of supporting frames 24A, and the shift lever 26 is made able to rotate in the front-rear direction with respect to the base plate 12 and integrally with the retainer 20.

An avoidance hole 28, that is triangular in cross-section and structures an avoidance portion, is formed in the end portion that is at the left side and the lower side of the intermediate block 26A. The avoidance hole 28 opens toward the left side, the front side and the rear side, and the upper side surface thereof is inclined in a direction heading toward the right side while heading toward the lower side.

Select shafts 30, that serve as second supported portions (supported portions) and supporting shafts, are provided integrally with the front surface and the rear surface of the intermediate block 26A. The pair of select shafts 30 project-out respectively toward the front and the rear from the intermediate block 26A. The upper side portions of the select shafts 30 are circular shafts 30A that are substantially disk-shaped and serve as one side supported portions. The outer peripheral surfaces of the circular shafts 30A are curved in circular arc-shapes in cross-section. The lower end portions of the select shafts 30 are plate shafts 30B that are shaped as curved plates and serve as other side supported portions. The lower surfaces of the plate shafts 30B are curved in circular arc-shapes in cross-section. The curvature central axes of the outer peripheral surfaces of the circular shafts 30A and the lower surfaces of the plate shafts 30B coincide, and the lower surfaces of the plate shafts 30B are disposed beneath the curvature central axes, and the radii of curvature thereof are large as compared with those of the outer peripheral surfaces of the circular shafts 30A. The vertical direction intermediate portions of the select shafts 30 are intermediate shafts 30C that are substantially rectangular plate-shaped, and the intermediate shafts 30C connect the circular shafts 30A and the plate shafts 30B.

The amounts of projection of the circular shafts 30A and the intermediate shafts 30C from the intermediate block 26A are the same, and are small as compared with the amounts of projection of the plate shafts 30B from the intermediate block 26A. The front-rear direction distance between the projecting distal end surfaces of the pair of circular shafts 30A and intermediate shafts 30C is large as compared with the front-rear direction distance between the projecting distal end surfaces of the pair of supporting frames 24A at the retainer 20, and is small as compared with the front-rear direction distance between the projecting distal end surfaces of the pair of supporting pillars 24B at the retainer 20. The front-rear direction distance between the projecting distal end surfaces of the pair of plate shafts 30B is large as compared with the front-rear direction distance between the projecting distal end surfaces of the pair of supporting frames 24A and the front-rear direction distance between the projecting distal end surfaces of the pair of supporting pillars 24B.

Avoidance surfaces 32, that are planar and that structure the avoidance portion, are formed at the right surfaces of the portions, that are further toward the projecting distal end sides than the circular shafts 30A and the intermediate shafts 30C, of the plate shafts 30B. The avoidance surfaces 32 are inclined in directions of heading toward the left side while heading toward the upper side, and are disposed parallel to the upper side surface of the avoidance hole 28 that is at the intermediate block 26A.

The select shafts 30 are fit-together with the select frame 24 interiors (the supporting holes) of the retainer 20. The outer peripheral surfaces of the circular shafts 30A of the select shafts 30 are fit-together with the inner peripheral surfaces of the supporting frames 24A of the select frames 24. The lower surfaces of the plate shafts 30B of the select shafts 30 are fit-together with the upper surfaces of the supporting pillars 24B of the select frames 24. Therefore, the select shafts 30 are rotatably supported at the select frames 24, and the shift lever 26 is rotatable in the left-right direction with respect to the retainer 20 and with the select shafts 30 being the central axis. Further, the rotation central axis of the shift lever 26 with respect to the retainer 20 coincides with the curvature central axes of the inner peripheral surfaces of the supporting frames 24A, the upper surfaces of the supporting pillars 24B, the outer peripheral surfaces of the circular shafts 30A, and the lower surfaces of the plate shafts 30B.

A lever 26B, that is solid-cylindrical and serves as an operating portion, is provided at the upper side portion of the shift lever 26. The lever 26B is made integral with the intermediate block 26A, and extends-out upward from the intermediate block 26A. The lever 26B is inserted-through the insert-through hole 18 of the cover 16, and extends-out at the upper side of the cover 16. Due to the lever 26B being operated in the front-rear direction and the left-right direction by a passenger (the driver) of the vehicle, the shift lever 26 is rotatingly operated in the front-rear direction (the shifting direction, one direction) and in the left-right direction (the selecting direction, the other direction), respectively.

A mechanism portion 26C is provided at the lower side portion of the shift lever 26. The mechanism portion 26C is made integral with the intermediate block 26A, and projects-out toward the radial direction outer side of the shift lever 26 with respect to the intermediate block 26A and the lever 26B. A guiding pillar 34, that is solid-cylindrical and serves as a guiding portion, is provided integrally with the rear portion of the mechanism portion 26C, and the guiding pillar 34 extends-out toward the lower side.

A gate plate 36, that is plate-shaped and serves as a guiding member, is provided integrally with the portion at the lower side and the rear side of the base plate 12 interior. A guide hole 38 of a predetermined shape (in the present embodiment, an h-shape as seen in plan view) is formed so as to pass-through the gate plate 36. The guiding pillar 34 of the mechanism portion 26C at the shift lever 26 is inserted-through the guide hole 38. Therefore, rotation of the guiding pillar 34 is regulated by the peripheral surface of the guide hole 38, the range of rotation of the shift lever 26 is prescribed, the rotation of the guiding pillar 34 is guided by the guide hole 38, and the rotational operation of the shift lever 26 is guided. Further, due to the range of rotation of the shift lever 26 in the left-right direction being prescribed, the plate shafts 30B of the select shafts 30 of the shift lever 26 falling-out from the supporting pillars 24B of the select frames 24 of the retainer 20 is regulated.

Due to the shift lever 26 being rotatingly operated, the shift position can be changed, and the shift position of the shift lever 26 can be changed to, for example, an "H" position (home position), an "N" position (neutral position), an "R" position (reverse position), a "D" position (drive position) and a "B" position (brake position).

Operation of the present embodiment is described next.

Figure 4:
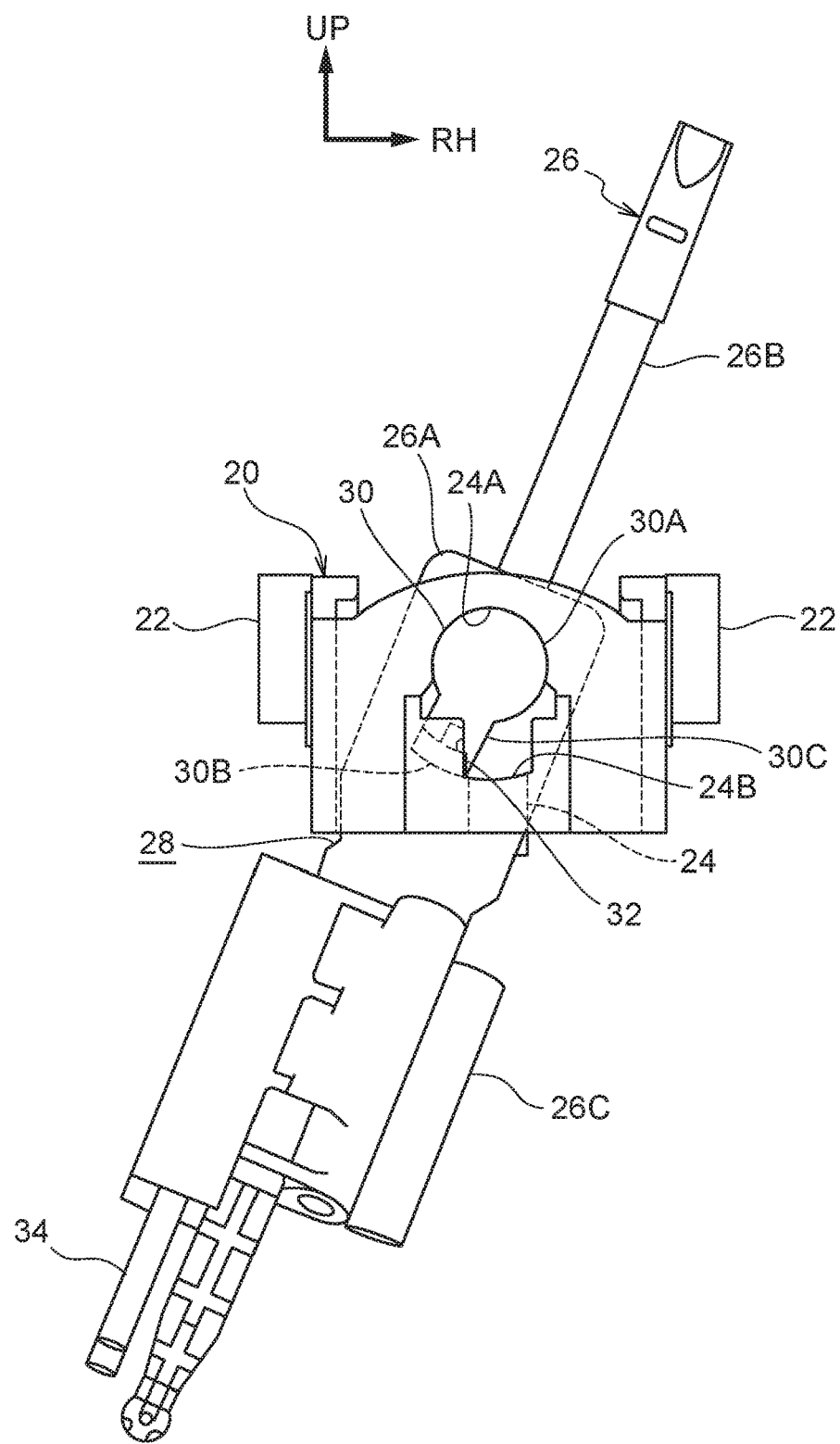
FIG. 4 is a side view that is seen from the rear side and shows a state in which a shift lever of the shift lever device relating to the embodiment of the present invention is assembled to the retainer.

In the shift lever device 10 of the above-described structure, as shown in FIG. 4, due to the shift lever 26 being inserted into the retainer 20 from the upper side portion and the select shafts 30 of the shift lever 26 (the intermediate block 26A) being inserted within the select frames 24 of the retainer 20, the outer peripheral surfaces of the circular shafts 30A and the lower surfaces of the plate shafts 30B of the select shafts 30 are supported by the inner peripheral surfaces of the supporting frames 24A and the upper surfaces of the supporting pillars 24B of the select frames 24 respectively, and the shift lever 26 is supported at the retainer 20 so as to be able to rotate in the left-right direction.

By the way, at the select frames 24, the amounts of projection of the supporting pillars 24B into the retainer 20 are small as compared with the amounts of projection of the supporting frames 24A into the retainer 20.

Here, at the select shafts 30, the amounts of projection of the circular shafts 30A and intermediate shafts 30C from the intermediate block 26A are small as compared with the amounts of projection of the plate shafts 30B from the intermediate block 26A. At the time when the select shafts 30 are inserted into the select frames 24, the circular shafts 30A and the intermediate shafts 30C can pass the supporting pillars 24B, and the plate shafts 30B can be inserted into the select frames 24 from the gaps (insertion holes) at the left side between the supporting frames 24A and the supporting pillars 24B. Therefore, as compared with a case in which the amounts of projection of the circular shafts 30A and the intermediate shafts 30C from the intermediate block 26A are the same as the amounts of projection of the plate shafts 30B from the intermediate block 26A, and the circular shafts 30A and the intermediate shafts 30C cannot pass the supporting pillars 24B, the angle of inclination of the shift lever 26 in the left-right direction with respect to the retainer 20 at the time when the select shafts 30 are inserted within the select frames 24 can be made to be small. Due thereto, the dimension of the retainer 20 in the left-right direction (the tilting direction of the shift lever 26 that is orthogonal to the rotation axis direction of the shift lever 26 with respect to the retainer 20 and the direction of insertion of the shift lever 26 into the retainer 20) can be made to be small, and the shift lever device 10 can be made to be compact in the left-right direction.

Moreover, at the select shafts 30, the radii of curvature of the lower surfaces of the plate shafts 30B are large as compared with those of the outer peripheral surfaces of the circular shafts 30A, and the lower surfaces of the plate shafts 30B are, with respect to the outer peripheral surfaces of the circular shafts 30A, disposed at the rotation radial direction outer sides of the shift lever 26 with respect to the retainer 20. Therefore, as compared with a case in which the positions, in the rotation radial direction of the shift lever 26 with respect to the retainer 20, of the lower surfaces of the plate shafts 30B are made to coincide with those of outer peripheral surfaces of the circular shafts 30A, the tilting angle of the shift lever 26 with respect to the retainer 20 in the left-right direction for avoiding interference of the plate shafts 30B with the supporting pillars 24B at the time when the select shafts 30 are inserted into the select frames 24 (the time when the plate shafts 30B are inserted into the select frames 24 from the left-side gaps between supporting frames 24A and the supporting pillars 24B, and the time when the lower surfaces of the plate shafts 30B reach the positions of the upper surfaces of the supporting pillars 24B) can be made to be small. Due thereto, the dimension of the retainer 20 in the left-right direction can be made to be even smaller, and the shift lever device 20 can be made to be more compact in the left-right direction.

Moreover, at the time of inserting the select shafts 30 into the select frames 24, in the state in which the upper side surface of the avoidance hole 28 of the intermediate block 26A is disposed parallel to the left wall of the retainer 20, the left wall of the retainer 20 is inserted in the avoidance hole 28, and interference of the intermediate block 26A with the left wall of the retainer 20 is avoided. Moreover, the avoidance surfaces 32 of the plate shafts 30B are disposed parallel to the left surfaces of the supporting pillars 24B, and interference of the plate shafts 30B with the supporting pillars 24B is avoided. Therefore, as compared with a case in which the avoidance hole 28 and the avoidance surfaces 32 are not formed in the intermediate block 26A and the plate shafts 30B respectively, the tilting angle of the shift lever 26 with respect to the retainer 20 in the left-right direction at the time when the select shafts 30 are inserted into the select frames 24 can be made to be small. Due thereto, the dimension of the retainer 20 in the left-right direction can be made to be even smaller, and the shift lever device 10 can be made to be more compact in the left-right direction.

Further, the shift lever 26 is operated at the lever 26B that is at the upper side portion thereof. Therefore, there is no need for the portion, that is further toward the lower side than the retainer 20 that is not the side that is operated, of the shift lever 26 to be inserted within the retainer 20. Thus, the portion, that is further toward the lower side than the retainer 20, of the shift lever 26 can be made to be large, and the mechanism portion 26C can easily be provided at the portion, that is further toward the lower side than the retainer 20, of the shift lever 26. Moreover, because the mechanism portion 26C is not provided at the portion, that is further toward the lever 26B side than the retainer 20, of the shift lever 26, the axial direction dimension (the vertical direction dimension) of the lever 26B can be made to be small, the rotational radius of the lever 26B with respect to the retainer 20 can be made to be small, and the operational stroke of the shift lever 26 (the lever 26B) in the left-right direction can be made to be short.

Moreover, at the select shafts 30, the outer peripheral surfaces of the circular shafts 30A are, with respect to the lower surfaces of the plate shafts 30B, disposed at the rotation radial direction inner side of the shift lever 26 with respect to the retainer 20, and the lever 26B is provided at the circular shaft 30A sides of the select shafts 30. Therefore, as compared with a case in which the lever 26B is provided at the plate shaft 30B sides of the select shafts 30, the rotation radius of the lever 26B with respect to the retainer 20 can be made to be small, and the operational stroke of the shift lever 26 (the lever 26B) in the left-right direction can be made to be even shorter.

Further, the upper surfaces of the supporting pillars 24B are disposed beneath (at the side opposite from the lever 26B of) the rotation central axis of the shift lever 26 with respect to the retainer 20. Therefore, the upper surfaces of the supporting pillars 24B can effectively support the lower surfaces of the plate shafts 30B with respect to load that is inputted to the shift lever 26 from the lever 26B, and the supporting pillars 24B can effectively support the shift lever 26.

Note that, in the present embodiment, there is a structure in which the shift lever 26 is inserted into the retainer 20 from the upper side portion. However, there may be a structure in which the shift lever 26 is inserted into the retainer 20 from the lower side portion. In this case, for example, the arrangement of the select frames 24 and the select shafts 30 in the vertical direction is reversed.

Moreover, in the present embodiment, the select frames 24 are provided at the retainer 20, and the select shafts 30 are provided at the shift lever 26. However, the select shafts 30 (supporting portions) may be provided at the retainer 20, and the select frames 24 (supported portions) may be provided at the shift lever 26. In this case, the arrangement of the select frames 24 and the select shafts 30 in the vertical direction may be reversed.

Further, in the present embodiment, the avoidance portion (the avoidance hole 28 and the avoidance surfaces 32) is provided at the shift lever 26. However, it suffices to provide the avoidance portion at at least one of the retainer 20 or the shift lever 26.

Moreover, in the present embodiment, the supporting portions (the select frames 24) are provided at the retainer 20, and the supported portions (the select shafts 30) are provided at the shift lever 26. However, the supporting portions may be provided at the base plate 12, the supported portions may be provided at the retainer 20, the base plate 12 may be made to be the supporting body, and the retainer 20 and the shift lever 26 may be made to be the shift body.

Further, in the present embodiment, the shift lever device 10 is a floor-type device and is provided at the floor portion of the vehicle cabin. However, the shift lever device 10 may be set at the steering column or the instrument panel of a vehicle.

The disclosure of Japanese Patent Application No. 2014-153685 that was filed on Jul. 29, 2014 is, in its entirety, incorporated by reference into the present specification.

EXPLANATION OF REFERENCE NUMERALS 10 shift lever device (shift device)
20 retainer (supporting body)
24 select frame (supporting portion)
26 shift lever (shift body)
28 avoidance hole (avoidance portion)
30 select shaft (supported portion)
32 avoidance surface (avoidance portion)

The invention claimed is:

1. A shift device comprising:
a supporting body at which a supporting portion is provided;
a shift body that is inserted into the supporting body from one side portion and is rotatably supported by the supporting body, and at which a shift position is changed due to the shift body being rotated;
a supported portion that is provided at the shift body so as to be integrally rotatable therewith with respect to the supporting body, the supported portion comprising a first portion and a second portion wherein the second portion is a protruding portion that is axially protruding out from the first portion, wherein, due to the supported portion being supported by the supporting portion, the shift body is rotatably supported by the supporting body, and
an avoidance portion that is provided at at least one of the supporting body or the shift body, and that causes avoidance of interference of the shift body with the supporting body at a time when the shift body is inserted into the supporting body from the one side portion.

2. A shift device comprising: a supporting body at which a supporting portion is provided;
a shift body that is inserted into the supporting body from one side portion and is rotatably supported by the supporting body, and at which a shift position is changed due to the shift body being rotated; and
a supported portion that is provided at the shift body so as to be integrally rotatable therewith with respect to the supporting body, the supported portion comprising a first portion and a second portion wherein the second portion is a protruding portion that projects away from the first portion in a rotation radial direction outer side of the shift body with respect to the one side portion of the supported portion, wherein, due to the supported portion being supported by the supporting portion, the shift body is rotatably supported by the supporting body, and
an avoidance portion that is provided at at least one of the supporting body or the shift body, and that causes avoidance of interference of the shift body with the supporting body at a time when the shift body is inserted into the supporting body from the one side portion.

3. The shift device of claim 1, wherein the shift body is operated at one side of the supporting body.

4. The shift device of claim 1, wherein another side portion of the supporting portion is disposed at another side of a rotation central axis of the shift body.

5. The shift device of claim 2, wherein the shift body is operated at one side of the supporting body.

6. The shift device of claim 2, wherein another side portion of the supporting portion is disposed at another side of a rotation central axis of the shift body.

7. The shift device of claim 2, wherein another side portion of the supported portion extends further along a rotation central axis of the shift body than the one side of the supported portion.

8. A shift device comprising: a supporting body at which a supporting portion is provided;
a shift body that is inserted into the supporting body from one side portion and is rotatably supported by the supporting body, and at which a shift position is changed due to the shift body being rotated; and
a supported portion that is provided at the shift body so as to be integrally rotatable therewith with respect to the supporting body, the supported portion comprising a first portion and a second portion wherein the second portion is a protruding portion that projects away from the first portion in a rotation radial direction outer side of the shift body with respect to the one side portion of the supported portion,
wherein, due to the supported portion being supported by the supporting portion, the shift body is rotatably supported by the supporting body, and
wherein the second portion of the supported portion extends further along a radial distance from a rotation central axis of the shift body than the first portion of the supported portion such that a radius of curvature of the another side portion is larger than a radius of curvature of the one side of the supported portion.

9. A shift device comprising: a supporting body at which a supporting portion is provided;
a shift body that is inserted into the supporting body from one side portion and is rotatably supported by the supporting body, and at which a shift position is changed due to the shift body being rotated; and
a supported portion that is provided at the shift body so as to be integrally rotatable therewith with respect to the supporting body, the supported portion comprising a first portion and a second portion wherein the second portion is a protruding portion that projects away from the first portion in a rotation radial direction outer side of the shift body with respect to the one side portion of the supported portion,
wherein, due to the supported portion being supported by the supporting portion, the shift body is rotatably supported by the supporting body,
wherein the another side portion of the supported portion extends further along a rotation central axis of the shift body than the one side of the supported portion, and
wherein the another side portion is radially offset from the rotation central axis.

\* \* \* \* \*